(12) United States Patent
Kitajima et al.

(10) Patent No.: US 11,878,380 B2
(45) Date of Patent: Jan. 23, 2024

(54) DEVICE AND METHOD FOR FIXING NUT TO INNER SURFACE OF PIPE MEMBER

(71) Applicant: AOYAMA SEISAKUSHO CO., LTD., Niwa-Gun (JP)

(72) Inventors: Dan Kitajima, Niwa-Gun (JP);
Kenichiro Araki, Niwa-Gun (JP);
Kazuhiro Koga, Niwa-Gun (JP);
Keiichiro Masui, Niwa-Gun (JP);
Tsuyoshi Kojima, Niwa-Gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 0 days.

(21) Appl. No.: 18/155,099

(22) Filed: Jan. 17, 2023

(65) Prior Publication Data

US 2023/0173624 A1    Jun. 8, 2023

Related U.S. Application Data

(63) Continuation of application No. PCT/JP2021/033472, filed on Sep. 13, 2021.

(30) Foreign Application Priority Data

Sep. 23, 2020  (JP) .............................. 2020-158849

(51) Int. Cl.
  *B23P 19/06*  (2006.01)
(52) U.S. Cl.
  CPC .................. *B23P 19/062* (2013.01)
(58) Field of Classification Search
  CPC .............. B23P 19/062; Y10T 29/5343; Y10T 29/53722; Y10T 29/53726; Y10T 29/5307; F16B 37/068; F16B 37/045; F16B 37/065; B21J 15/46
  See application file for complete search history.

(56) References Cited

U.S. PATENT DOCUMENTS 5,329,694 A * 7/1994 Sickels ................. B23P 19/062
                                                    29/243.518
7,559,136 B2    7/2009 Shinjo et al.
8,046,908 B2* 11/2011 Shinjo .................. B23P 19/062
                                                    29/243.518

FOREIGN PATENT DOCUMENTS

JP          4268952 B2    5/2009

OTHER PUBLICATIONS

International Search Report and Written Opinion dated Jan. 20, 2022 (Application No. PCT/JP2021/033472).

* cited by examiner

*Primary Examiner* — Jason L Vaughan
*Assistant Examiner* — Amanda Kreiling
(74) *Attorney, Agent, or Firm* — BURR PATENT LAW, PLLC (57) ABSTRACT

A device for fixing a nut to an inner surface of a pipe member having a small inner diameter is provided. The device includes a unit box (10) to be inserted into the pipe member, a rotation shaft (11) extending from the unit box (10) to the outside of the pipe member, a cam fixed to the rotation shaft (11) in the unit box (10), and a nut holder (18) that advances from the unit box (10) toward the inner surface of the pipe member by the rotation of the cam. A pressure receiving member to be abutted on the inner surface of the pipe member is provided on an opposite surface of the nut holder (18).

6 Claims, 8 Drawing Sheets

DEVICE AND METHOD FOR FIXING NUT TO INNER SURFACE OF PIPE MEMBER

TECHNICAL FIELD

The present invention relates to a device and a method for fixing a nut to an inner surface of a pipe member.

BACKGROUND ART

For the purpose of reducing weight of automobiles, pipe members having a hollow section such as extruded aluminum materials and steel pipes have been increasingly adopted. To attach other materials to the surface of such a pipe member, a technique of fixing a nut to the inner surface of the pipe member has been required.

Figure 11:
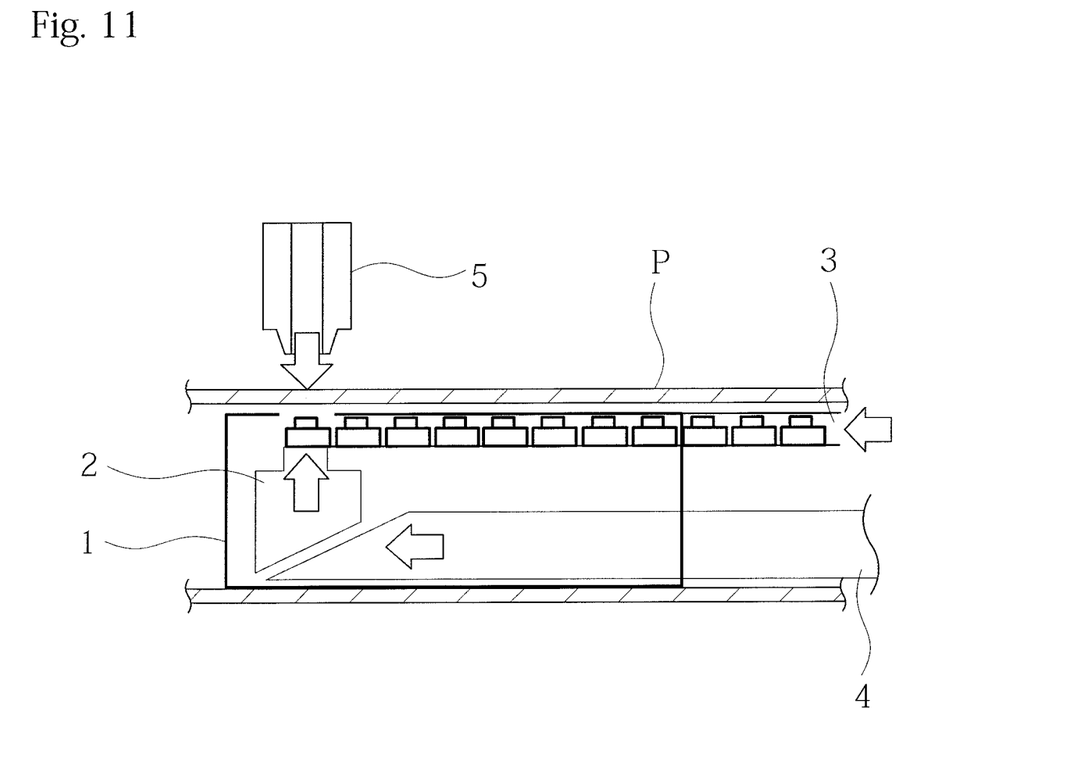
FIG. 11 is a schematic sectional view illustrating a conventional technique.

As a device for fixing a nut to the inner surface of the pipe member, a technique described in Patent Literature 1 has been known. FIG. 11 is a sectional view illustrating the outline thereof. The device has a structure in which a punch 2 having a slanted bottom portion is provided at a distal end portion of a shaft 1 to be inserted into a pipe member P, a self-piercing and clinching nut is fed onto the punch 2 through a nut feed passage 3, and a sheet pile 4 having a wedge-shaped slanted distal end is inserted into a bottom portion of the shaft 1, whereby the punch 2 is raised and the self-piercing and clinching nut is driven. The upper surface of the pipe member P is pressed by a die 5, and the self-piercing and clinching nut is clinched and fixed to the inner surface of the pipe member P by the punch 2 and the die 5.

However, this conventional device requires the shaft 1 incorporating the punch 2 and the sheet pile 4, and has a problem that it can be used only for the pipe member P having an inner diameter larger than that of the shaft 1. In addition, since the self-piercing and clinching nut and the punch 2 are raised from an inner side of the pipe member P by sliding the sheet pile 4, and clinched and fixed to the wall surface of the pipe member P, it is necessary to synchronize the punch 2 and the die 5. Accordingly, there has been a problem that a nut attachment surface of the pipe member P is distorted when the time lag occurs between operation timing of the punch 2 and that of the die 5. Further, since the outer diameter of the shaft 1 is naturally smaller than the inner diameter of the pipe member P, there is a possibility that when the nut is fixed, the shaft 1 is in a cantilevered state and is inclined by a fixing load, and the nut cannot be clinched and fixed normally. In order to avoid this cantilevered state, a mechanism that brings the shaft and the pipe member into close contact with the floor surface is additionally required.

CITATION LIST

Patent Literature

[PTL 1]
Patent No. JP 4268952 B2

SUMMARY OF INVENTION

Technical Problem

An object of the present invention is to solve the above-described conventional problems, and to provide a device and a method capable of fixing the nut to the inner surface of the pipe member having an inner diameter smaller than that of a conventional pipe member and suppressing distortion of the nut attachment surface of the pipe member.

Solution to Problem

A device configured to fix a nut to an inner surface of a pipe member of the present invention includes a unit box to be inserted into the pipe member, a rotation shaft extending from the unit box to an outside of the pipe member, a cam fixed to the rotation shaft in the unit box, and a nut holder configured to advance from the unit box toward the inner surface of the pipe member by rotation of the cam.

It is preferable to have a structure in which a bearing configured to support the rotation shaft is provided to be connected to the unit box, and it is preferable to have a structure in which a pressure receiving member to be abutted on the inner surface of the pipe member is provided on an opposite surface of the nut holder of the unit box.

In addition, a method of fixing a nut to an inner surface of a pipe member of the present invention includes: using the device described above and configured to fix the nut to the inner surface of the pipe member, holding the nut in the nut holder, and inserting the nut and the nut holder into the pipe member; driving the rotation shaft from the outside of the pipe member to rotate the cam; advancing the nut holder toward the inner surface of the pipe member to bring the nut into close contact with the inner surface of the pipe member; driving a die disposed at an outer peripheral position of the pipe member into the pipe member; and fixing the nut to the inner surface of the pipe member.

It is preferable that a pressure receiving member on an opposite surface of the nut holder of the unit box be abutted on the inner surface of the pipe to prevent deformation of the pipe member due to pressurizing force that drives the die into the pipe member.

Advantageous Effects of Invention

According to the present invention, the nut holder is inserted into the pipe member with the nut held by the nut holder, and then the nut holder is advanced toward the inner surface of the pipe member by the cam to bring the nut into close contact with the inner surface of the pipe member. Thereafter, the die disposed at the outer peripheral position of the pipe member is driven into the pipe member, whereby the nut is fixed to the inner surface of the pipe member. For this reason, a shaft as in the conventional case is unnecessary, and it is sufficient that the unit box and the rotation shaft be inserted into the pipe member, whereby the nut can be fixed also to the inner surface of the pipe member having an inner diameter smaller than that of a conventional pipe member.

Further, according to the present invention, it is sufficient that the cam of the present device be rotated to the attachment position in advance to bring the nut into close contact with the inner surface of the pipe member, and thereafter the die be operated. Accordingly, it is not necessary to synchronize the punch and the die as in the conventional case. Therefore, distortion of the nut attachment surface of the pipe member P can be suppressed.

Furthermore, when the pressure receiving member on the opposite surface of the nut holder of the unit box is abutted on the inner surface of the pipe to receive pressurizing force that drives the die into the pipe member, the device does not tilt inside the pipe member as in the conventional case, and the nut can be correctly attached.

DESCRIPTION OF EMBODIMENTS

Figure 1:
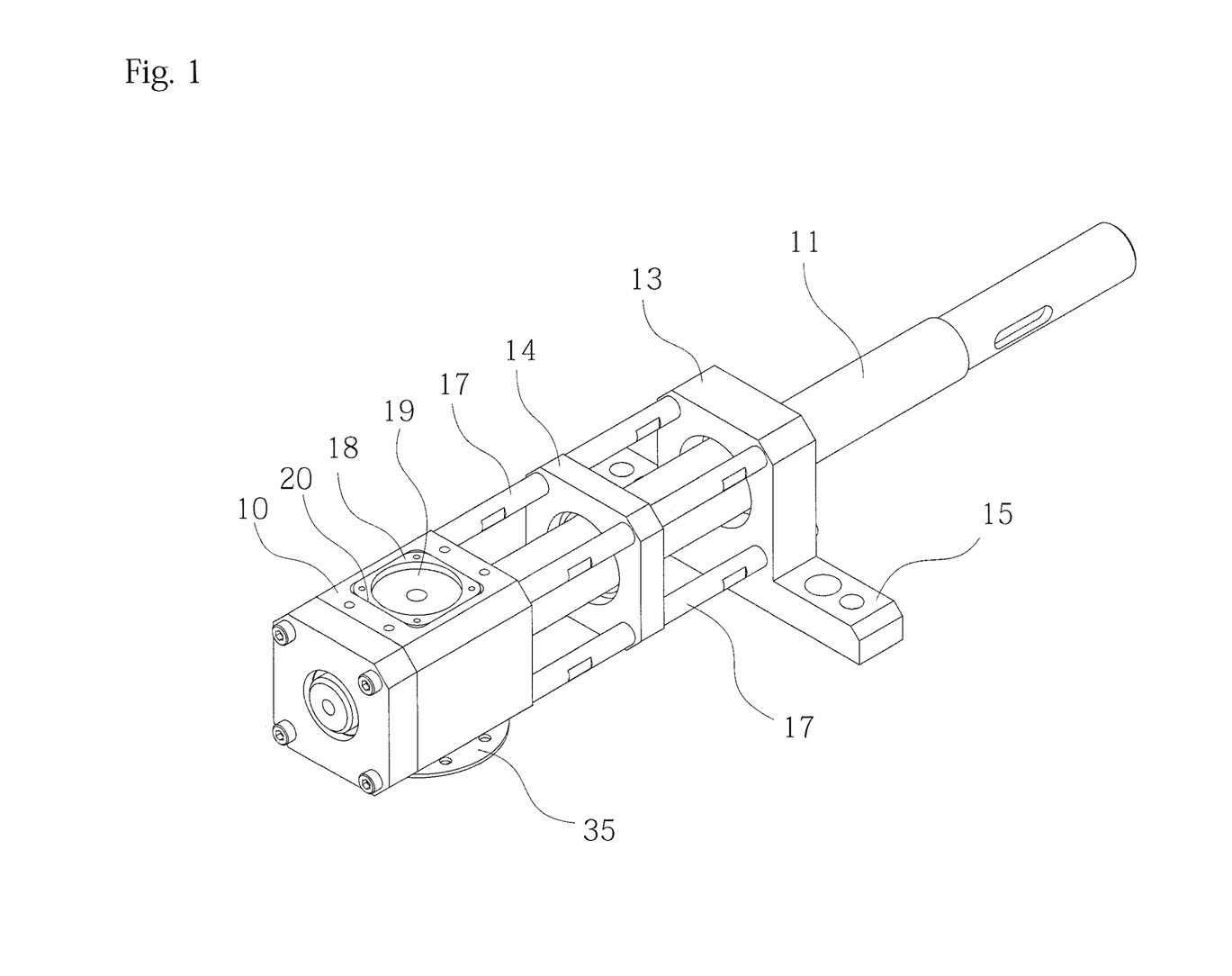
FIG. 1 is a perspective view of a nut fixing device according to an embodiment.
Figure 2:
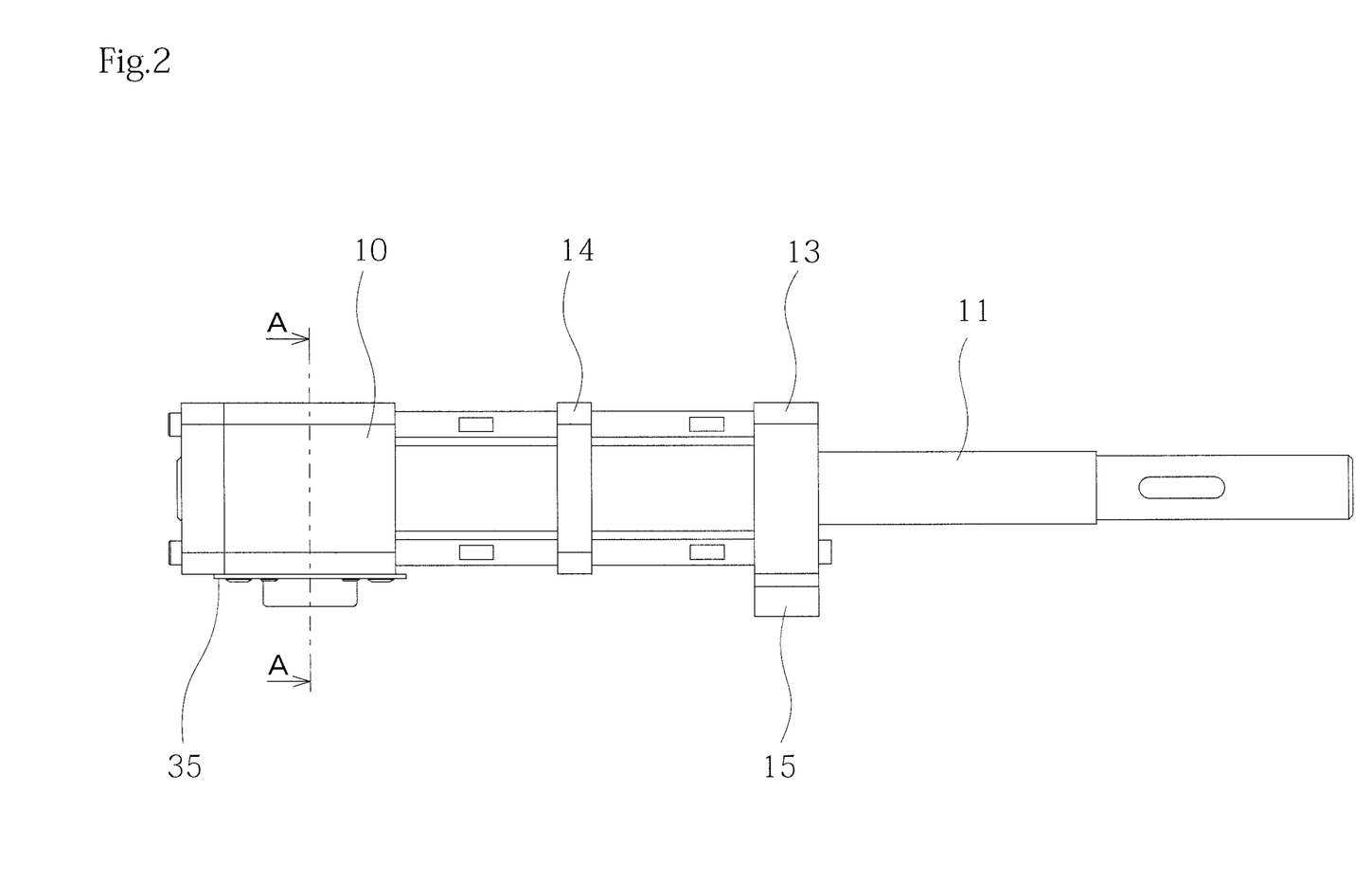
FIG. 2 is a front view of the nut fixing device of the embodiment.
Figure 3:
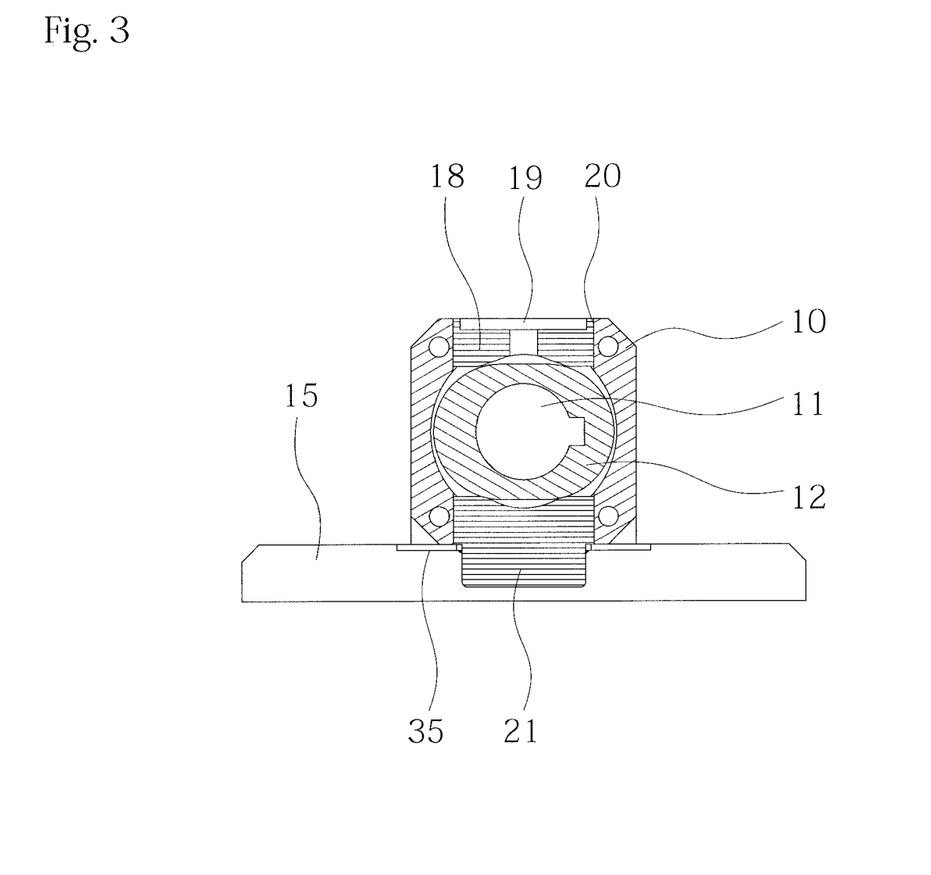
FIG. 3 is a sectional view taken along line A-A of FIG. 2.

Hereinafter, a preferred embodiment of the present invention will be described. FIG. 1 is a perspective view of a nut fixing device of an embodiment, FIG. 2 is a front view thereof, and FIG. 3 is a sectional view taken along line A-A of FIG. 2. An element denoted by 10 is a unit box to be inserted into a pipe member P, and a rotation shaft 11 and a cam 12 keyed to the rotation shaft 11 are provided in a central portion of the unit box 10. The cam 12 of this embodiment is an elliptical or oval cam.

Figure 4:
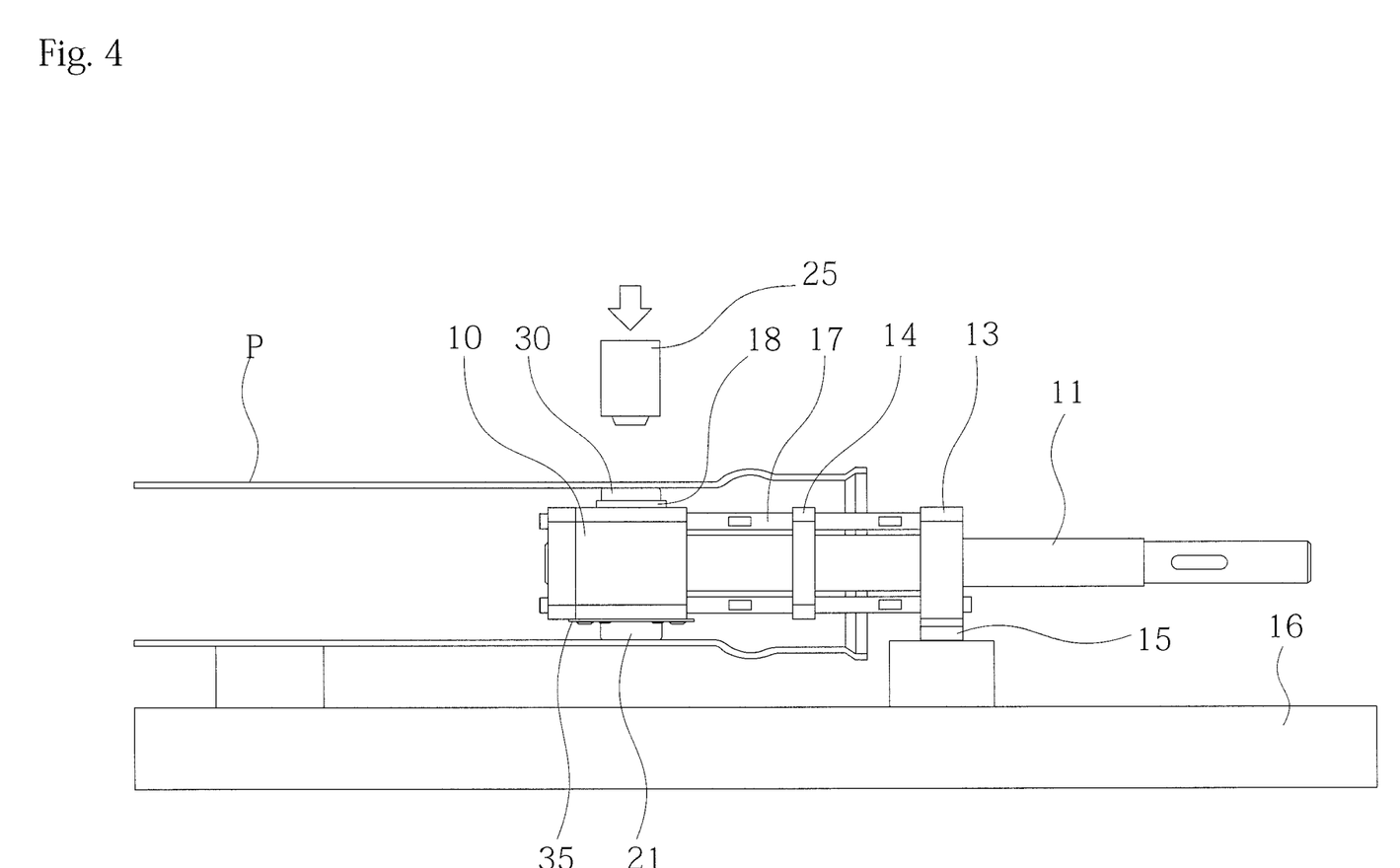
FIG. 4 is a sectional view illustrating a use state of the embodiment.

The rotation shaft 11 extends from the unit box 10 to the outside of the pipe member P, and is rotatably supported by a bearing 13 and an intermediate bearing 14. The bearing 13 includes a leg portion 15 extending left and right, and is fixed to a base 16 outside an opening portion of the pipe member P as illustrated in FIG. 4. The intermediate bearing 14 has an outer diameter equal to that of the unit box 10 so as to be inserted into the pipe member P. The unit box 10, the intermediate bearing 14, and the bearing 13 are connected and integrated by connecting materials 17. The rotation shaft 11 is rotated by a manual handle or a motor.

As illustrated in FIG. 3, the unit box 10 has opening portions on top and bottom faces thereof, and a nut holder 18 that protrudes from and retracts into the unit box 10 by rotation of the cam 12 is provided in the upper portion. The nut holder 18 has a nut holding portion 19 that is recessed in a circular shape in an upper surface thereof, and has a structure capable of holding various nuts such as self-piercing and clinching nuts and press-fit nuts. In the present embodiment, the nut holder 18 has a substantially square shape as illustrated in FIG. 1, and can protrude and retract upward and downward in a state where an outer peripheral surface 20 thereof is abutted on an upper opening portion of the unit box 10 as illustrated in FIG. 3.

A pressure receiving member 21 to be abutted on an inner surface of the pipe member P is provided on an opposite surface of the nut holder 18 of the unit box 10. This pressure receiving member 21 can also protrude and retract upward and downward by the cam 12 and a pressure receiving member retraction mechanism 35 in a state where an outer peripheral surface 22 of the pressure receiving member 21 is abutted on a lower opening portion of the unit box 10.

Next, a method of fixing nut to the inner surface of the pipe member using the nut fixing device of the present invention will be described.

Figure 5:
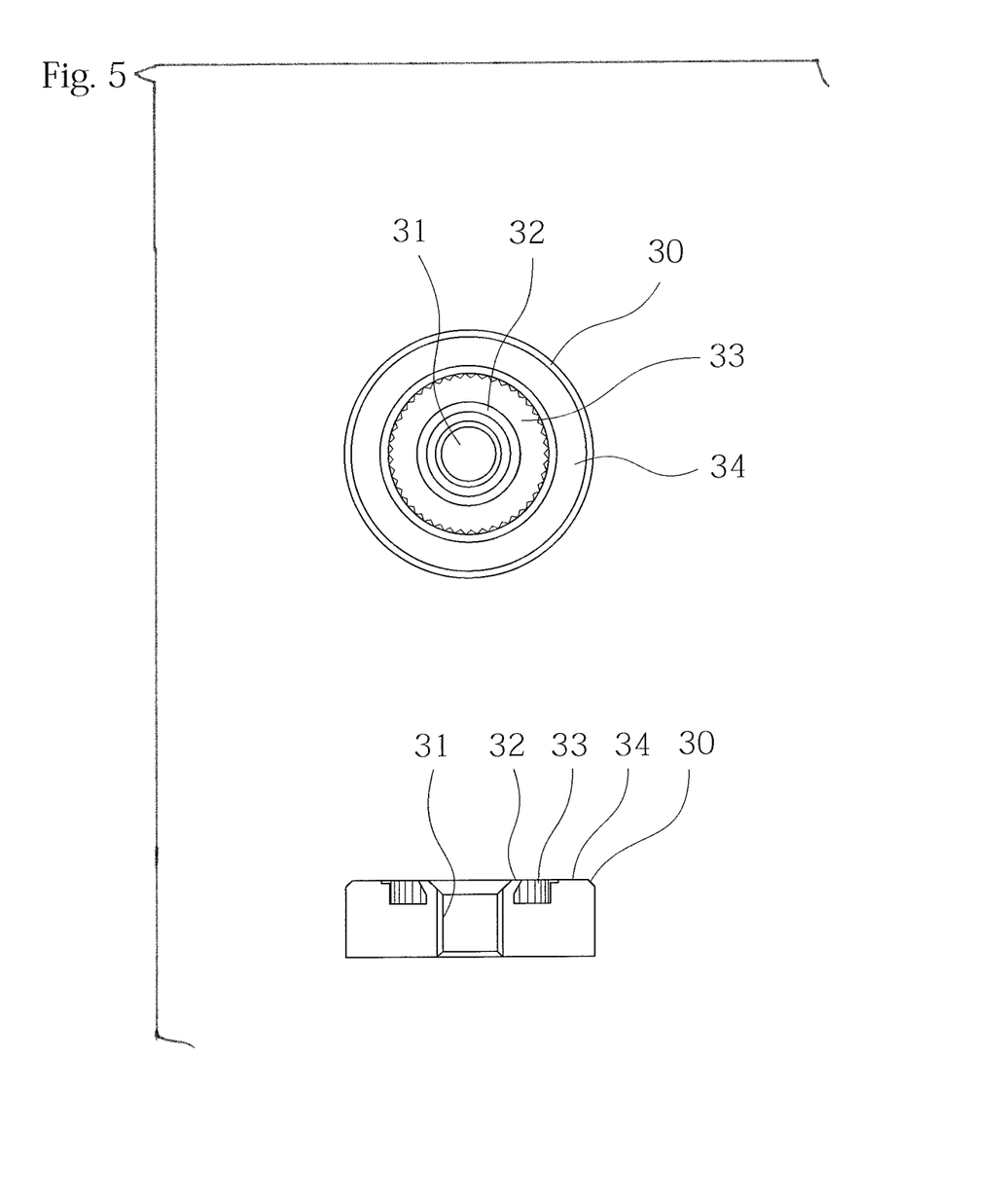
FIG. 5 is a plan view and a sectional view of a self-piercing and clinching nut.

In this embodiment, a self-piercing and clinching nut 30 illustrated in FIG. 5 is fixed to the inner surface of the pipe member P made of a quadrangular extruded aluminum material. This self-piercing and clinching nut 30 includes an annular punching portion 32 on an outer periphery of a female screw portion 31, an annular groove portion 33 formed on an outer periphery of the annular punching portion 32, and a bearing surface 34 formed on an outer periphery of the annular groove portion 33, and the annular punching portion 32 and the bearing surface 34 have the same height as illustrated in the drawing.

Figure 6:
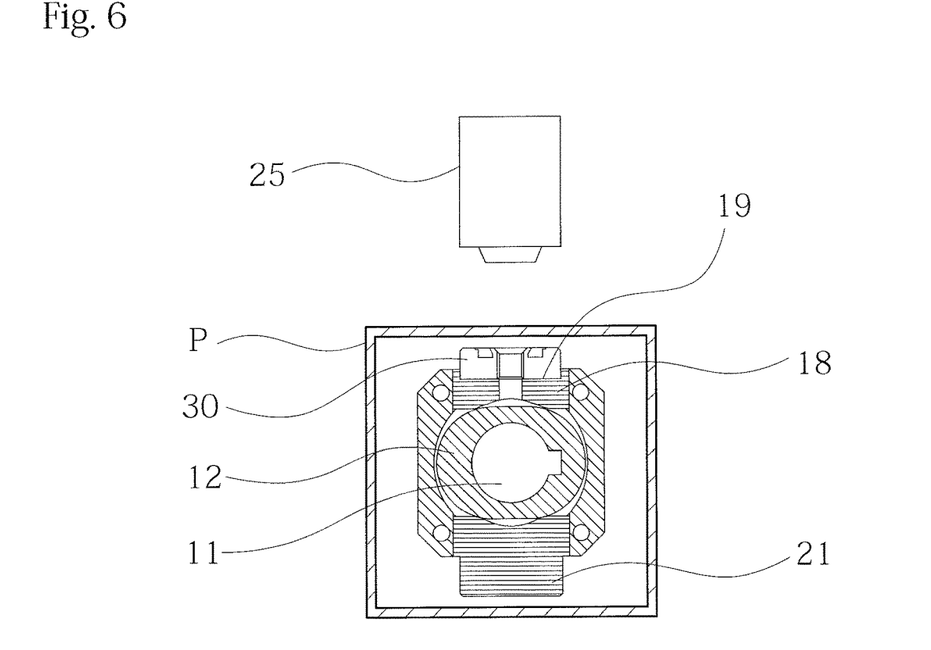
FIG. 6 is a sectional view illustrating a state in which a self-piercing and clinching nut is inserted into an inner surface of a pipe member.

First, as illustrated in FIG. 6, the self-piercing and clinching nut 30 is placed on the nut holding portion 19 of the nut holder 18, and the unit box 10 is inserted into the pipe member P. At this time, the cam 12 is at a position where a long diameter thereof is directed horizontally, and the nut holder 18 and the pressure receiving member 21 are at positions lowered to the inside of the unit box 10.

Figure 7:
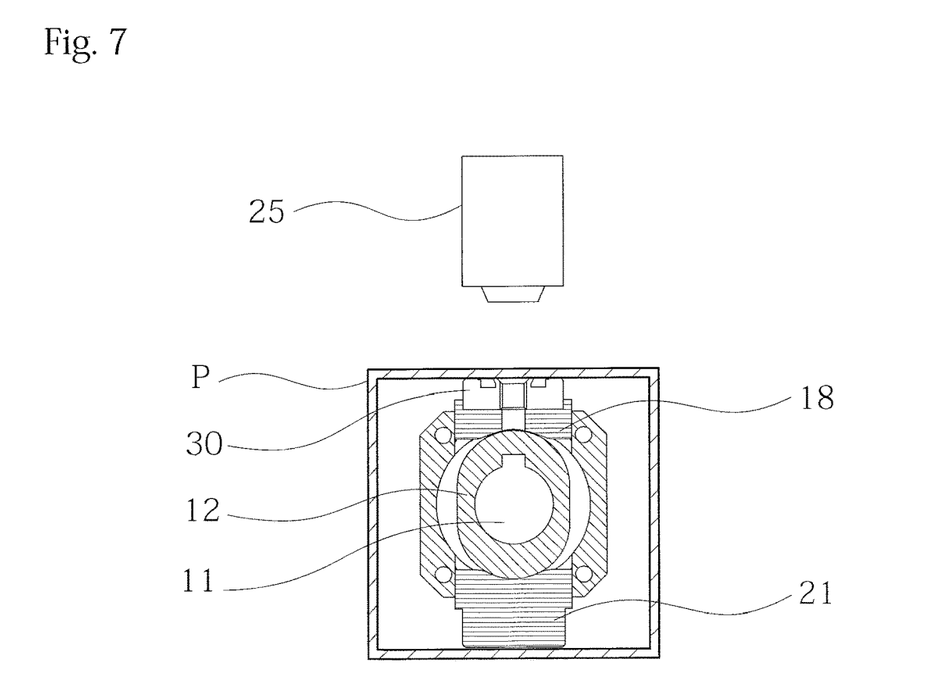
FIG. 7 is a sectional view illustrating a state in which a nut holder and a pressure receiving member are brought into close contact with an inner surface of a pipe member P.

Next, as illustrated in FIG. 7, the rotation shaft 11 is rotated so that the long diameter of the cam 12 is in the vertical direction. The nut holder 18 is pushed outward by this rotation of the cam 12, and the annular punching portion 32 and the bearing surface 34, both of which constitute the upper surface of the self-piercing and clinching nut 30, are brought into close contact with the upper inner surface of the pipe member P. Further, the pressure receiving member 21 is also brought into close contact with the lower inner surface of the pipe member P. By making the inner diameter of the unit box 10 equal to the inner diameter of the pipe member P in this manner, the unit box 10 is reliably fixed to the inside of the pipe member P.

Figure 8:
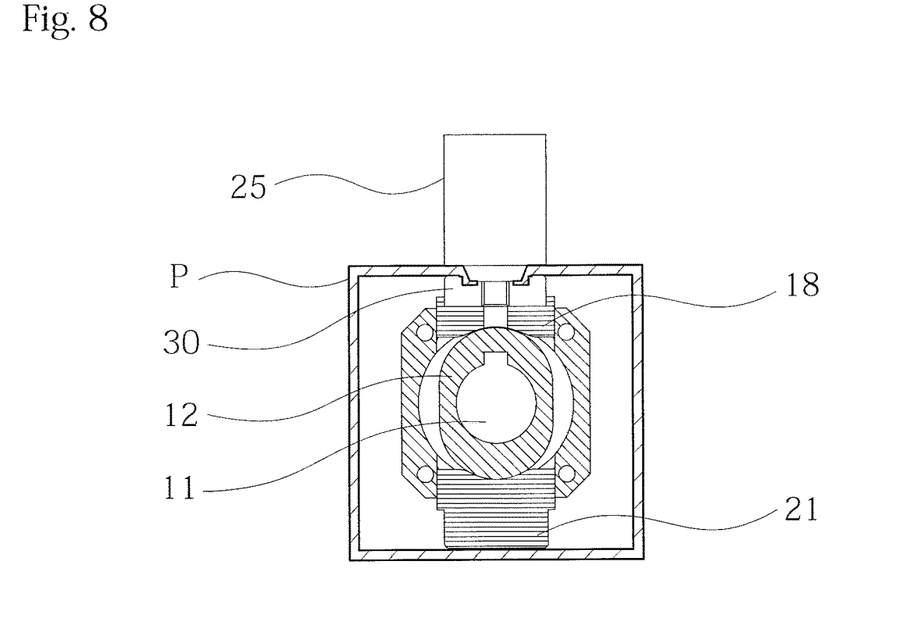
FIG. 8 is a sectional view illustrating a state in which a die is lowered.

Next, as illustrated in FIG. 8, a die 25 disposed at an outer peripheral position of the pipe member P is driven into the pipe member P, then while the pipe member P is punched to form a through hole, and the metal material at a peripheral edge of the through hole is plastically flowed into the annular groove portion 33 of the self-piercing and clinching nut 30. In this way, the self-piercing and clinching nut 30 is fixed to the inner surface of the pipe member P. Since the self-piercing and clinching nut 30 is reliably held by the unit box 10, the self-piercing and clinching nut 30 can be firmly fixed. Further, since the pressure receiving member 21 is abutted on the inner surface of the pipe member P, deformation of the pipe member P due to pressurizing force that drives the die 25 into the pipe member P can be prevented.

Figure 9:
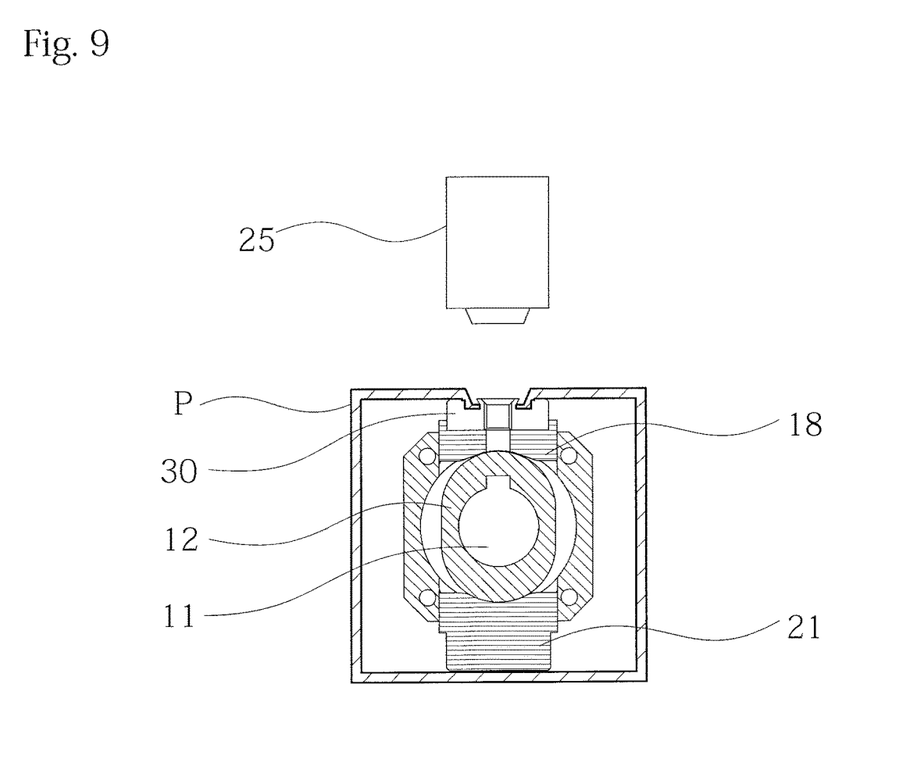
FIG. 9 is a sectional view illustrating a state in which a die is raised.
Figure 10:
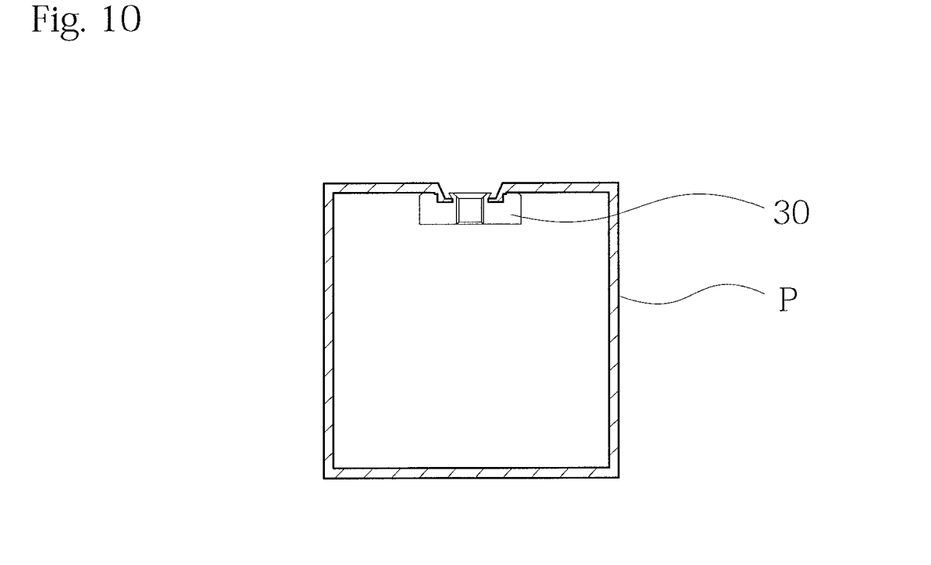
FIG. 10 is a sectional view illustrating a state in which a self-piercing and clinching nut is fixed to an inner surface of a pipe member.

Thereafter, as illustrated in FIG. 9, the die 25 is raised, and the rotation shaft 11 is rotated to set the long diameter of the cam 12 to be directed laterally, then the nut holder 18 and the pressure receiving member 21 are retracted, and thereafter the unit box 10 is pulled out from the pipe member P. FIG. 10 illustrates a state in which the self-piercing and clinching nut 30 is fixed to the inner surface of the pipe member P.

In the embodiment described above, the self-piercing and clinching nut 30 in which the annular punching portion 32 and the bearing surface 34 have the same height is fixed. The self-piercing and clinching nut 30 of this embodiment has an advantage that it can be fixed by the die 25 while being held inside the pipe member P. However, the type of the nut is not limited thereto, and a press-fit nut, a weld nut, and the like can also be fixed in addition to a normal self-piercing and clinching nut in which the annular punching portion 32 is higher than the bearing surface 34. When these nuts are fixed, it is sufficient that the nut holder 18 be moved by the cam 12.

In the embodiment described above, the rectangular extruded aluminum material is used as the pipe member P. However, the present invention can also be applied to a pipe member having a round section by changing a shape of the unit box 10.

As described above, according to the present invention, it is not necessary to provide the shaft incorporating the punch and the sheet pile as illustrated in FIG. 11, and thus the nut can be fixed to the inner surface of the pipe member P having an inner diameter smaller than that of the conventional pipe member. In addition, since it is sufficient that the die 25 be operated after the nut is held on the inner surface of the pipe member P, it is not necessary to synchronize the die with the punch as in the conventional case. Furthermore, since the unit box 10 can be reliably fixed to the inside of the pipe member P, there are many advantages, for example, distortion of a nut attachment surface of the pipe member P can be suppressed.

EXAMPLES

Examples of the present invention will be described below.

Using the fixing device and the self-piercing and clinching nut both of which have been described in the above embodiment, a test of fixing a self-piercing and clinching nut having a diameter of 22.5 mm and a thickness (overall height) of 9 mm to an inner surface of a quadrangular extruded aluminum material having a section of 60 mm×60 mm and a plate thickness of 2 mm was performed. The extruded aluminum material was cut to a length of 100 mm, and a self-piercing and clinching nut was fixed at the center position in the longitudinal direction. The press-fit load of the die is 40 kN.

The idling torque of the fixed self-piercing and clinching nut was measured using a dial torque wrench. In addition, the clinching force (pull-out load) of the fixed self-piercing and clinching nut was measured using a tensile and compression testing machine. As a result, the average value of the idling torque was 30 Nm, which was similar to that of the case where the self-piercing and clinching nut was fixed to the extruded aluminum material having an open section by the conventional method. In addition, the average value of the clinching force was 3.5 kN, which was similar to that of the case where the self-piercing and clinching nut was fixed to the extruded aluminum material having an open section by the conventional method. In all cases, the number of samples N was three.

Next, the amount of change in an outer diameter and an inner diameter of the quadrangular extruded aluminum material was measured by a caliper. When the gap between the self-piercing and clinching nut and the inner surface of the pipe was set to 0 as in the embodiment, the amount of change in the outer diameter was 0.02 mm, and the amount of change in the inner diameter was 0.04 mm, which were extremely minute. In addition, it has been confirmed that both of the amount of change in the outer diameter and the amount of change in the inner diameter can be made zero by strongly pressing the self-piercing and clinching nut against the inner surface of the pipe using the cam.

REFERENCE SIGNS LIST

P Pipe member
1 Shaft
2 Punch
3 Nut feed passage
4 Sheet pile
5 Die
10 Unit box
11 Rotation shaft
12 Cam
13 Bearing
14 Intermediate bearing
15 Leg portion
16 Base
17 Connecting material
18 Nut holder
19 Nut holding portion
20 Outer peripheral surface
21 Pressure receiving member
22 Outer peripheral surface
30 Self-piercing and clinching nut
31 Female screw portion
32 Annular punching portion
33 Annular groove portion
34 Bearing surface
35 Pressure receiving member retraction mechanism

The invention claimed is:

1. A device configured to fix a nut to an inner surface of a pipe member, the device comprising:
   a unit box to be inserted into the pipe member;
   a rotation shaft extending from the unit box to an outside of the pipe member;
   an elliptical or oval cam fixed to the rotation shaft in the unit box; and
   a nut holder configured to advance from the unit box toward the inner surface of the pipe member by rotation of the elliptical or oval cam.

2. The device configured to fix the nut to the inner surface of the pipe member according to claim 1, wherein a bearing configured to support the rotation shaft is provided to be connected to the unit box.

3. The device configured to fix the nut to the inner surface of the pipe member according to claim 1, wherein a pressure receiving member to be abutted on the inner surface of the pipe member is provided on an opposite surface of the nut holder of the unit box.

4. A method for fixing a nut to an inner surface of a pipe member, the method comprising:
   using the device configured to fix the nut to the inner surface of the pipe member according to claim 1, holding the nut in the nut holder, and inserting the nut and the nut holder into the pipe member;
   driving the rotation shaft from the outside of the pipe member to rotate the elliptical or oval cam;
   advancing the nut holder toward the inner surface of the pipe member to bring the nut into close contact with the inner surface of the pipe member;
   driving a die disposed at an outer peripheral position of the pipe member into the pipe member; and
   fixing the nut to the inner surface of the pipe member.

5. The method for fixing the nut to the inner surface of the pipe member according to claim 4, wherein a pressure receiving member on an opposite surface of the nut holder of the unit box is abutted on the inner surface of the pipe to prevent deformation of the pipe member due to pressurizing force that drives the die into the pipe member.

6. The device configured to fix the nut to the inner surface of the pipe member according to claim 2, wherein a pressure receiving member to be abutted on the inner surface of the pipe member is provided on an opposite surface of the nut holder of the unit box.

\* \* \* \* \*